Figure 1:
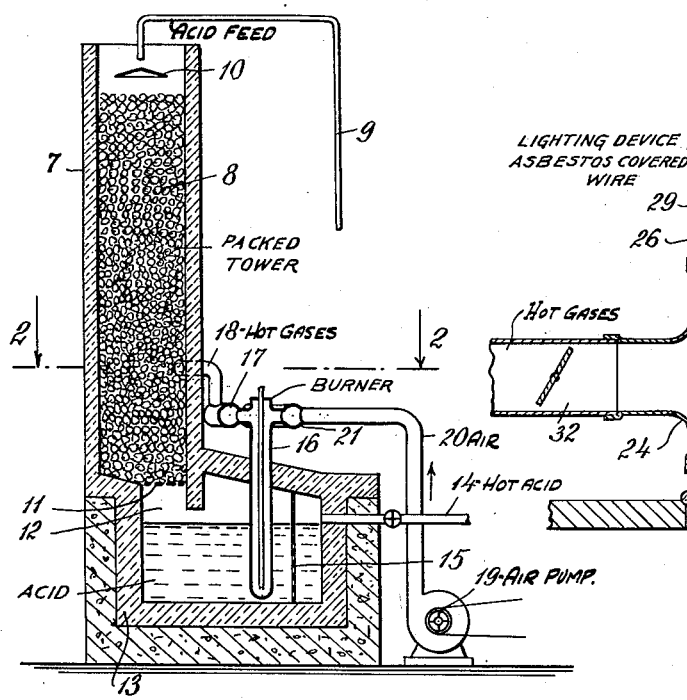

Dec. 29, 1936. H. W. SHELDON 2,065,617
METHOD FOR THE RECOVERY OF SULPHURIC ACID
Filed Nov. 10, 1934 2 Sheets-Sheet 1

Dec. 29, 1936.  H. W. SHELDON  2,065,617
METHOD FOR THE RECOVERY OF SULPHURIC ACID
Filed Nov. 10, 1934  2 Sheets-Sheet 2
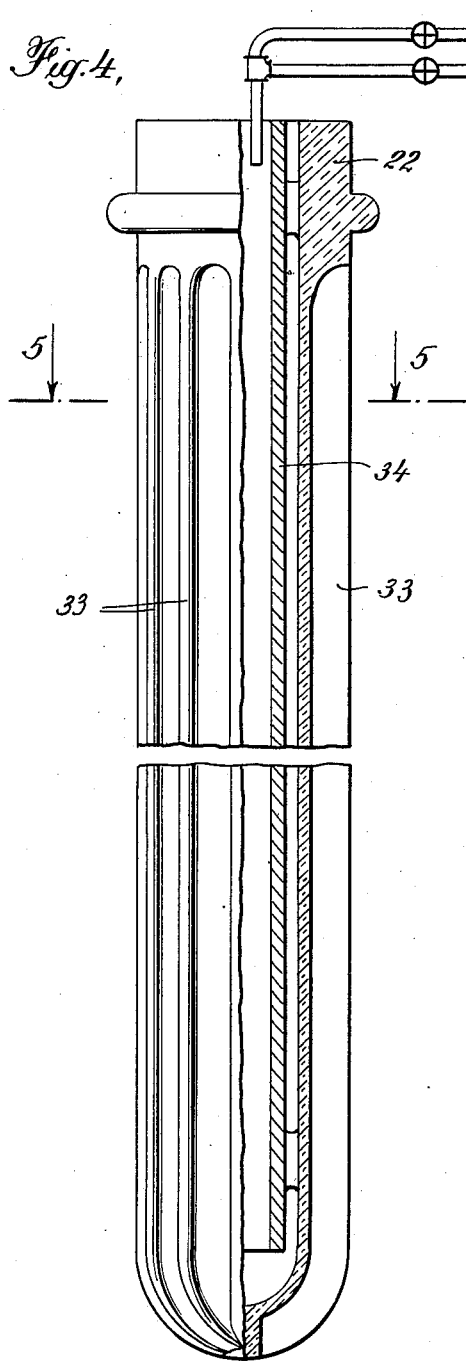
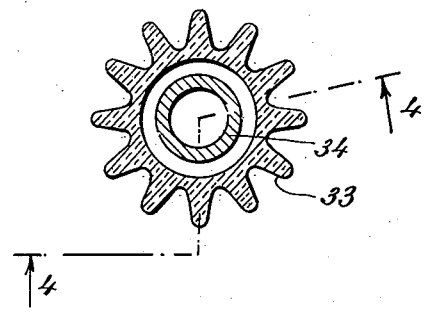
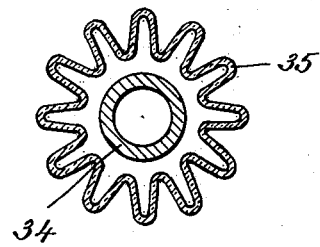
INVENTOR
Howard W Sheldon
BY
ATTORNEY Patented Dec. 29, 1936

2,065,617

UNITED STATES PATENT OFFICE 2,065,617

METHOD FOR THE RECOVERY OF SULPHURIC ACID

Howard W. Sheldon, Haddonfield, N. J., assignor to Socony-Vacuum Oil Company, Incorporated, New York, N. Y., a corporation of New York Application November 10, 1934, Serial No. 752,397

6 Claims. (Cl. 23—173)

This invention is directed to methods and apparatus for the recovery concentration, and purification of sulphuric acid which has been used in the treating of hydrocarbon oils. It is specifically directed to the application of these methods and apparatus to obtain recovered acid of high purity and concentration from spent acids used in the treatment of lubricating oils.

It has been proposed heretofore to heat recovered acid in a quiescent body out of contact with products of combustion in order that organic carbonaceous impurities contained therein might be oxidized. Such processes as have been proposed operate at a temperature level in the neighborhood of the boiling point of 89-91% sulphuric acid. The product or recovered acid obtained by treatment at these temperatures is usually not sufficiently high in purity for many oil refining uses. It is usually black and contains considerable quantities of dispersed carbonaceous materials. The quantity of this material may vary over wide limits depending upon the source of the recovered acid and the care used in operating the concentrating equipment. It is not uncommon to find acid reclaimed from the treatment of lubricating oils which contains in excess of 1% of combustible organic material. This black acid is particularly troublesome in the treatment of oils requiring high finished color, as it may impart color to them. It is also quite troublesome where a continuous acid treating process employing centrifuges for separation of oil and acid sludge is used, since the carbonaceous material deposits upon the centrifuge bowls and requires frequent shut downs for cleaning. Prior art processes of which I am aware are also subject to considerable trouble and loss of acid by fuming when operating at high temperature levels such as are necessary for even partial removal of the carbonaceous material. Of course a portion of these fumes may be recovered by the use of suitable precipitation equipment, such as the Cottrell apparatus, but the operation of this equipment introduces another operative step and further expense. Since the temperatures of operation of prior art processes are limited by fuming and similar difficulties, the time element for complete cleanup of acid is necessarily long, requiring extensive equipment installation. Similarly, the fume loss limitation on temperature levels restricts the previously proposed processes to the production of acid of about 90% strength, since sufficient temperature is not available for the concentration of acid to higher strength.

It is therefore an object of this invention to devise a method whereby the purification of recovered sulphuric acid may be conducted at temperature levels capable of substantially removing carbonaceous materials found troublesome when the acid is used in oil refining. An important object is the provision of a process of this nature wherein fume losses are reduced to a minimum. A further important object is the accomplishment of this purification at temperature levels sufficiently high to enable shorter reaction times with concurrent reductions in amount of material in process and in size of equipment necessary for a given throughput. A further important object is the accomplishment of operation at temperature levels sufficiently high so that the acid may be concentrated to a strength substantially in excess of 90%. A most important object is the provision of apparatus wherein the process may be carried out. Further objects are the attainment of compactness and efficiency in the apparatus for this process, and such other objects and advantages as may be hereinafter pointed out.

All of these objects and advantages are obtained by my improved process, and are obtained to a particular degree when that process is carried out in my preferred form of apparatus.

Figure 3:
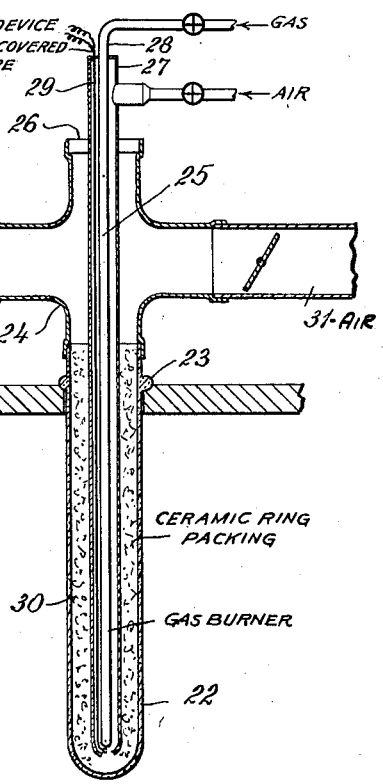
Figure 2:
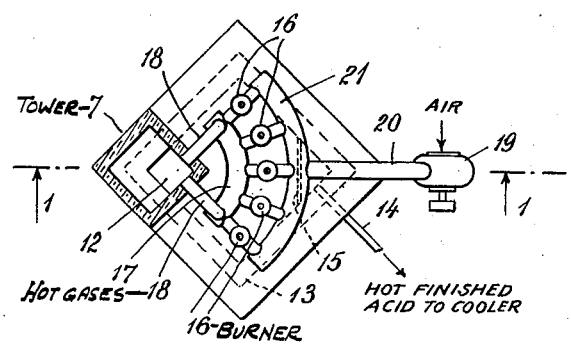

In order that my process and apparatus may be clearly understood, reference is now made to the drawings which are attached to and made a part of this specification. In these drawings, Figure 1 is a sectional elevation of a preferred form of apparatus and Figure 2 is a plan view of the same. Figure 3 is a section of a particular form of burner for use in the apparatus, Figure 4 is a vertical view, partially in section, of another form of burner construction, Figure 5 is a horizontal section through the burner shown in Figure 4, and Figure 6 is a horizontal section through still another type of burner.

In Figure 1, 7 represents a preheating tower, packed with ceramic contact material 8, over which acid to be treated is fed through line 9, falling upon distributor 10. The ceramic packing material is retained in the tower by a proper grid 11, and the acid from the tower discharges through the throat 12 into the concentration pot 13. This concentration pot is equipped with an overflow line 14 for the removal of treated acid, and a grating 15 prevents the passage of scum and coagulated impurities into the overflow line. This overflow line 14 leads to acid coolers which are not shown. Heat is applied to the concentration pot by a series of burners 16, which are later explained in detail. The gases of combustion from these burners 16 are collected in manifold 17 and passed into the preheating tower by flue 18. Further air for use in the preheating tower is introduced from the atmosphere by means of fan 19, conduit 20, and manifold 21. The use of flue gases from burners 16 in the preheating tower is optional, and the tower may be heated, if desirable, by heat from other sources, such as waste heat from the ordinary concentration pans, or it may even be heated by a separately fired furnace.

The burner used is shown in Figure 3, and is an internally fired surface combustion burner. As seen in Figure 3, it is composed of a tube 22, adapted to be mounted in the roof of the concentration pot and to depend thereinto, with its lower end submerged in the acid undergoing treatment. This mounting is facilitated by a moulding 23 surrounding the upper end of the tube which may rest in a corresponding seat in the roof of the concentration pot. Mounted upon the tube 22 at its top end is a cross 24 of suitable material, such as "transite" which is a mixture of asbestos and certain mineral cements, or of ceramic material. It is possible, so far as corrosion from flue gas is concerned, to make this fitting and all other flue gas parts of metal, but because they are exposed externally to a corrosive atmosphere, I prefer some such material as the "transite" mentioned. Through the upper end of the cross 24, I insert burner 25, and support it therein by plate 26, which also serves to close this opening of the fitting 24. Burner 25 consists of two concentric tubes 27 and 28. The outer tube 27 is connected to a suitable source of air under a sufficient pressure, and the inner tube 28 is connected to a source of supply of combustible gas. In order to ignite the combustion mixture I have inserted in tube 27 a pair of properly insulated wires, designed 29, leading to a spark gap at the termination of the concentric tubes. The space within the tube 22 outside of tube 27 is packed with a granular or ring formed ceramic packing. When the gas stream is ignited, surface combustion occurs in this packing, and the extremely high temperatures therein generated are readily transferred to the acid through the walls of tube 22. Tube 22 is preferably made of a high silicon cast iron, fused quartz, or other material resistant to both acid and temperature.

To provide rapid transfer of heat, I may increase the surface of muffle 22 by corrugations or fins. For instance, I may adopt the construction shown in Figure 4, wherein the external surface of the tube 22 is provided with longitudinal fins 33, more clearly seen in Figure 5, which is a horizontal section of the tube shown in Figure 4. If desired, the surface of tube 22 may be ribbed both inside and outside, as shown in Figure 6.

Instead of the surface combustion used in Figure 3, I may employ an open type of combustion, in which case I construct the tube 22 with an internal concentric muffle as indicated by numeral 34 in Figures 4, 5, and 6. In this case, the burner tubes 27 and 28 are positioned within the muffle 34, near its upper end. In some cases I find that it is preferable to use the muffle 34 even when using a surface combustion operation, and in this case, the interior of the muffle tube 34 below the end of the burner tubes will be packed with granular or ring-formed ceramic material. In any case, the use of the internal annular muffle is conducive to high rates of heat transfer, since the hot gases will pass out of the lower end of the muffle and up along the inner walls of the tube 22 at a high velocity conducive to a high rate of heat transfer.

To return to Figure 3, I dispose of the gases of combustion through a tube 32, fitted into one side outlet of the cross 24. In case these gases are not used in the preheating tower, this tube 32 leads to a stack and the other side outlet of cross 24 is suitable plugged. If, as preferred, these gases of combustion are used in the preheating tower, they are at too high a temperature for that use as they come from burner tube 22. To lower their temperature, I introduce air from the atmosphere through tube 31 inserted in the other side outlet of cross 24. In this preferred setup, referring to Figure 1, tube 32 connects the burner to manifold 17 and tube 31 connects it to manifold 21. These tubes 31 and 32 are both equipped with butterfly valves in order that properly balanced conditions of air and gas flow may be maintained.

The method of operation is as follows: Untreated black recovered acid, preferably concentrated already to a strength of 89–91% such as may be had by exposure to temperature of the nature of 540° F. is introduced to the top of preheating tower 7, and trickles down over the packing material therein. In that tower it encounters hot gases, and is preheated thereby to a temperature of approximately 425° F. In order to avoid the formation of fumes of $SO_3$ and the loss of acid thereby, the temperature of the preheating gases is adjusted so that they are not above approximately 700° F. at the time of first contact with the acid. I obtain control of this gas temperature preferably by diluting combustion gases with air, as pointed out above. I also find that the level of temperature of the acid at the throat (12), of the preheating tower is of importance in the avoidance of fumes, although the control at this point is not particularly delicate, and the temperature may vary from 400° to 600° F. The preferred temperature however, is 428° F. to 430° F. The acid leaving the tower drops into the body of acid in the concentration pot, which is maintained at a temperature of 620–630° F. Indirect heating at this temperature level not only serves to destroy the black carbonaceous organic impurities in a very short time, but also concentrates the acid to a strength in the neighborhood of 98%. I regard this temperature level of the concentrating pot as an important element of my process. It is high enough to bring about effective elimination of the carbonaceous impurities. It is likewise high enough to accomplish that elimination in a comparatively short time and enable a high throughput rate in the apparatus. It is also sufficiently elevated to effect the concentration of the feed acid to a strength of approximately 98%. Coupled with the controlled temperature level, I am enabled to bring about these desirable results without fume trouble or loss of sulphuric acids as fumes, and consequently do not have to resort to expensive precipitation devices. The only loss I encounter is that of an amount of $SO_2$ proportional to the amount of carbonaceous material in the black acid and produced during the elimination thereof. No one of the prior processes of which I am aware is capable of producing concurrently these results of high cleanliness, high concentration, and low loss. To accomplish these results, I find that the temperature level must be maintained near the range specified, and that when they are so maintained, a reaction time of approximately one hour is required in the concentration pot.

I have herein disclosed a new process, clothed in a distinctive type of apparatus. This process need not be carried out in the form of apparatus here shown, although the apparatus shown is highly adapted to this process and is preferred. Certain equivalent constructions have been disclosed, and other equivalents may be suggested to those skilled in the art. All of these variations I deem to be a part of my invention, and claim them as such, subject to the limitations to be found in the following claims.

I claim:

1. That method of completion of the regeneration of sludge acid already sufficiently concentrated to exhibit a boiling point of the order of 500° F. which comprises the steps of continuously passing the said acid in a stream countercurrent to a heated gas to preheat the said acid to an elevated temperature at which the tendency of said acid to absorb fumes of $SO_3$ is still greater than its tendency to generate such fumes, discharging the preheated acid into a quiescent pool of acid, heating said quiescent pool out of contact with oxidizing gases to a temperature in excess of 600° F., thereby to oxidize the remaining carbonaceous impurities and to concentrate the acid to a strength in excess of 95 per cent, continuously withdrawing concentrated acid from said pool, passing the gases generated from said pool in countercurrent through the acid undergoing preheating, heating said quiescent pool by a combustion maintained in indirect heat transfer relation with the acid therein, diluting the spent gases of such combustion with sufficient air to obtain a temperature of mixed gases not substantially in excess of 700° F., and utilizing such mixed gases as heating agent in the preheating stage.

2. That method of completion of the regeneration of sludge acid already sufficiently concentrated to exhibit a boiling point of the order of 500° F. which comprises the steps of continuously passing the said acid in countercurrent to a heated gas to preheat the said acid to a temperature not substantially in excess of 430° F., discharging the preheated acid into a quiescent pool of acid, heating said pool to a temperature in the range of 600° F. to 630° F. while maintaining it out of contact with oxidizing gases and spent products of combustion, continuously withdrawing from said pool acid concentrated to a strength in excess of 95 per cent, passing the gases generated from said pool in countercurrent through the acid undergoing preheating, heating said quiescent pool by a combustion maintained in indirect heat transfer relation with the acid therein, diluting the spent gases of such combustion with sufficient air to obtain a temperature of mixed gases not substantially in excess of 700° F., and introducing such mixed gases to the preheating stage to serve as heating agent therein.

3. That method of completion of the regeneration of sludge acid already sufficiently concentrated to exhibit a boiling point of the order of 500° F. which comprises the steps of continuously passing the said acid in countercurrent to a heated gas to preheat the said acid to a temperature not in excess of 600° F., discharging the preheated acid into a quiescent pool of acid, heating said pool to a temperature in the range of 600° F. to 630° F. while maintaining it out of contact with oxidizing gases and spent products of combustion, continuously withdrawing from said pool acid concentrated to a strength in excess of 95 per cent, passing the gases generated from said pool in countercurrent through the acid undergoing preheating, heating said quiescent pool by a combustion maintained in indirect heat transfer relation with the acid therein, diluting the spent gases of such combustion with sufficient air to obtain a temperature of mixed gases not substantially in excess of 700° F., and introducing such mixed gases to the preheating stage to serve as heating agent therein.

4. That method of decarbonization and further concentration of regenerated sludge acid of 500° F. to 540° F. boiling point, contaminated with carbon, which comprises the following steps: Continuously passing the acid in a flowing stream toward and into a quiescent pool, contacting the acid stream in a prior portion of its flow with tempered heating gases, heating only to a temperature at which the acid will still absorb $SO_3$ gas, contacting the stream in the remainder of its travel with gases containing $SO_3$, heating the pool to temperatures in excess of 600° F. while preventing contact of the acid therein with air and combustion gases, thereby to oxidize the carbonaceous impurities and further concentrate the acid to a strength in excess of 95%, continuously withdrawing clean concentrated acid from said pool, and passing only the gases generated from said pool in contact with the acid stream in its second stage.

5. That method of decarbonization and further concentration of regenerated sludge acid of 500° F. to 540° F., boiling point, contaminated with carbon, which comprises the following steps: Continuously passing the acid in a flowing stream toward and into a quiescent pool, contacting the acid stream in a prior portion of its flow with tempered heating gases, heating the acid to a temperature not substantially in excess of 430° F., contacting the stream in the remainder of its flow with gases containing $SO_3$, heating the pool to a temperature of 600° F. to 630° F. while preventing contact of the acid therein with air and combustion gases, thereby to oxidize the carbonaceous impurities and further concentrate the acid to a strength in excess of 95%, continuously withdrawing clean concentrated acid from said pool, and passing only the gases generated from said pool in contact with the acid stream in its second stage.

6. That method of decarbonization and further concentration of regenerated sludge acid of 500° F. to 540° F. boiling point, contaminated with carbon, which comprises the following steps: Continuously passing acid in a flowing stream toward and into a quiescent pool, contacting the acid stream in a first portion of its flow with tempered heating gases to heat it to a temperature of at least about 430° F., but not sufficiently high to deprive it of power to absorb $SO_3$ gas, contacting the stream in a second portion of its flow with gases containing $SO_3$, in the absence of air and products of combustion, heating the pool to a temperature of 600° F. to 630° F., while preventing contact of the acid therein with air and products of combustion, thereby to oxidize the carbonaceous impurities and further concentrate the acid, continuously withdrawing the clean concentrated acid from said pool, passing the gases generated from the pool in contact with the acid stream in its second stage, and proportioning the heating gas in relation to the pool gases so that the acid, upon its entry to the pool, is not heated to a temperature of more than about 600° F.

HOWARD W. SHELDON.